W. V. TURNER.
LOAD BRAKE APPARATUS.
APPLICATION FILED NOV. 5, 1910.

1,131,967.

Patented Mar. 16, 1915.
4 SHEETS—SHEET 1.

Fig. 1. FULL RELEASE POSITION.

Fig. 2. EMPTY, SERVICE APP. POSITION.

WITNESSES

INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

LOAD BRAKE APPARATUS.

1,131,967.  Specification of Letters Patent.  Patented Mar. 16, 1915.

Application filed November 5, 1910. Serial No. 590,927.

*To all whom it may concern:*

Be it known that I, WALTER V. TURNER, a citizen of the United States, residing at Edgewood, in the county of Allegheny and State of Pennsylvania, have invented new and useful Improvements in Load Brake Apparatus, of which the following is a specification.

This invention relates to fluid pressure brakes, and more particularly to a brake apparatus adapted to be adjusted for light braking power on empty cars or for heavy braking power on loaded cars.

The principal object of my invention is to provide an improved device of the above character in which the heavy braking power on loaded cars and the light braking power on empty cars is obtained with a minimum consumption of air and a minimum amount of apparatus.

With the present capacity of freight cars, it has become necessary, in order to secure an efficient brake on both loaded and empty cars, to provide means for adjusting the braking power according to the load on the car. Various devices have heretofore been proposed for this purpose, one type of which comprises a car brake equipment having the usual triple valve, brake cylinder, and auxiliary reservoir for braking on empty cars, and in addition, a second brake cylinder, means for cutting in said second brake cylinder on loaded cars, and a clutch mechanism for connecting the second brake cylinder to the brake rigging upon supplying fluid thereto, fluid being supplied to the second brake cylinder after the first brake cylinder piston has moved out to take up the slack in the brake rigging and apply the brake shoes to the wheels.

As the slack in the brake rigging is taken up by the movement of the first brake cylinder piston, only a slight movement of the second brake cylinder piston is necessary in order to obtain the added braking power of the second brake cylinder. Consequently the volume of air required for the second brake cylinder is small and the consumption of fluid is correspondingly reduced.

With this prior apparatus, however, it is necessary to obtain a certain pressure in the first brake cylinder sufficient to apply the brake shoes to the wheels, before air is supplied to the second brake cylinder, so that the effect of the second brake cylinder is not obtained until the train pipe pressure has been reduced sufficiently to secure the necessary brake cylinder pressure in the first brake cylinder and then when fluid is finally admitted to the second brake cylinder the braking power is suddenly increased to an excessive degree. From this point, further reductions in train pipe pressure do not produce the desired increases in brake cylinder pressure because the volume of the usual auxiliary reservoir must now equalize into two brake cylinders instead of one.

According to my invention, a take-up reservoir is provided which in load position is adapted to be charged with fluid under pressure and means are provided for connecting said reservoir to the first brake cylinder upon making an application of the brakes. A sufficiently high pressure is thus secured in the first brake cylinder, even under a light reduction in train pipe pressure, to fully take up the slack in the brake rigging and apply the brake shoes to the wheels with a substantial degree of pressure. When this pressure equals a predetermined degree, communication is opened to the second brake cylinder and the brake cylinder pressure is reduced somewhat by equalization into the second brake cylinder so that the braking power is not increased to any great extent over that obtained by the first brake cylinder before communication was opened to the second brake cylinder. The load braking power is thus obtained on the first light reduction in train pipe pressure, and the brake cylinder pressure may then be increased in the usual manner from the auxiliary reservoir by making further reductions in train pipe pressure, as desired.

In order to still further improve the operation, a reduction reservoir normally at atmospheric pressure may be provided which is adapted to be connected to the second brake cylinder in load position, so that the volume of the second brake cylinder is increased and thereby the equalized brake cylinder pressure is reduced sufficiently, so that the brake cylinder pressure obtained will correspond with the reduction in train pipe pressure, based on the standard ratio between brake cylinder pressure and the reduction in train pipe pressure which has been adopted as the most desirable. Furthermore, an additional reservoir volume may be provided which is adapted to be connected to the auxiliary reservoir in load position for the purpose of insuring that the ultimate degree of equalization between the brake cylinder volume and the auxiliary reservoir shall be maintained at the desired standard degree.

In the accompanying drawings.

Figure 4:
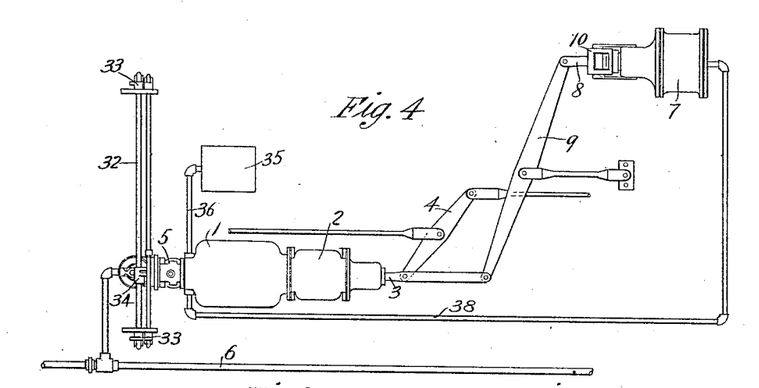
Fig. 4 a diagrammatic view of a car air brake equipment, with my improvements applied thereto.

According to one form of my invention, the car equipment may be arranged as shown in Fig. 4 of the drawings, in which an auxiliary reservoir 1, and brake cylinder 2 are provided, the push rod 3 of the brake cylinder piston being connected to the brake lever 4. A triple valve device 5 governed by variations in pressure in train pipe 6 controls the admission and release of fluid to and from the brake cylinder 2. So much of the apparatus may be of the usual standard construction except for certain modifications in the triple valve device to adapt the same to my invention.

In addition, a second brake cylinder 7 is provided having its push rod 8 connected to one end of a brake lever 9, the opposite end of which is connected to an extension of the push rod 3 of the first brake cylinder. The piston of the second brake cylinder is adapted to be operatively connected to the push rod 8 through a clutch device 10, the construction of which will be described hereinafter.

Figures 1, 2:
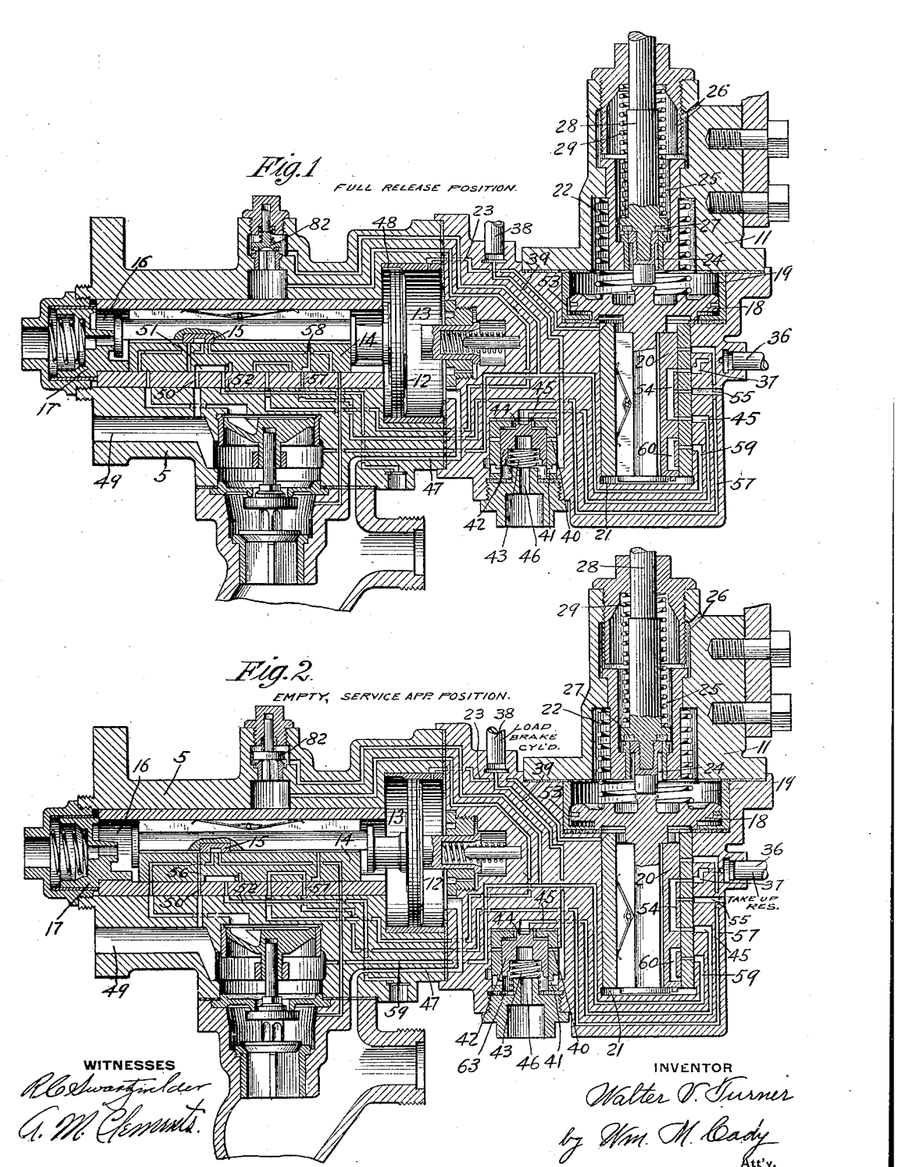
Figure 1 is a central sectional view of a load brake mechanism embodying my invention and showing the parts adjusted for empty car braking and in the normal full release position.
Fig. 2 a similar view, showing the parts in service application position.
Figures 3, 5, 6:
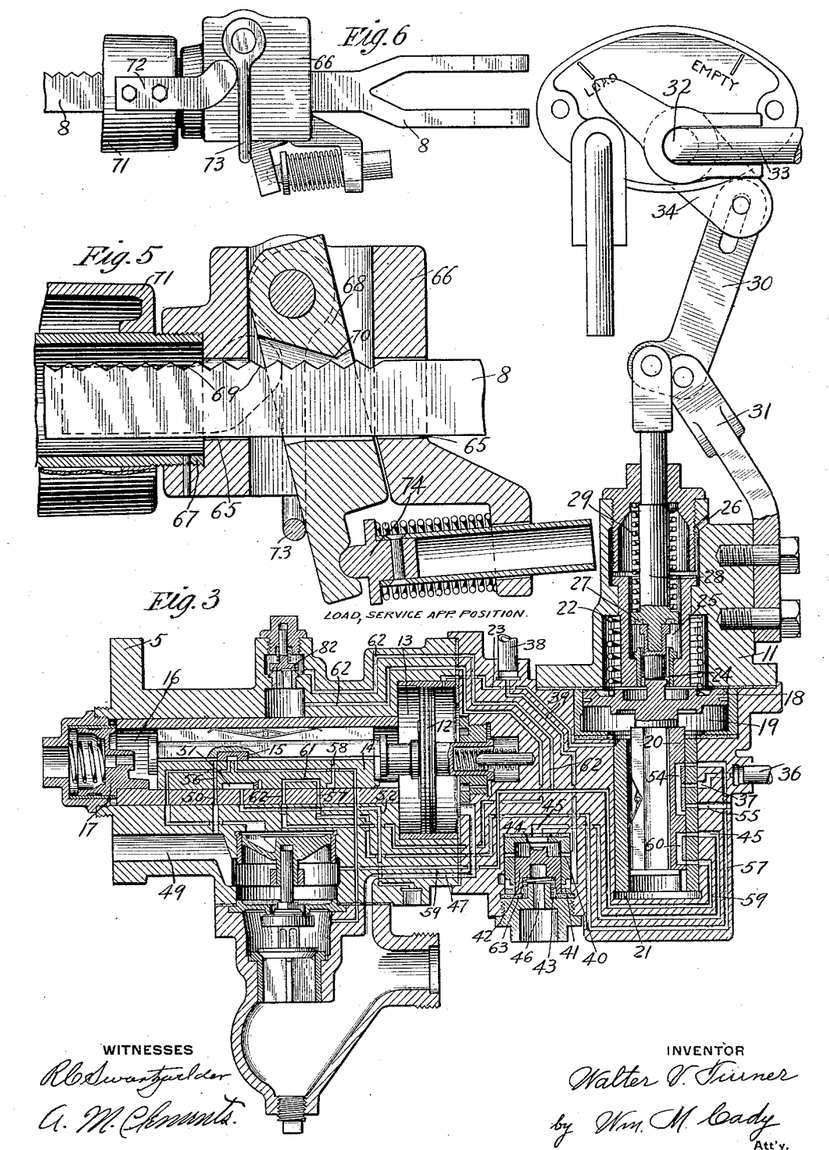
Fig. 3 a similar view, showing the parts adjusted for load braking and in service application position.
Fig. 5 a sectional detail of one form of clutch mechanism for the second brake cylinder.
Fig. 6 an elevational view of said clutch mechanism.

Considering now Figs. 1 to 3 inclusive, triple valve device 5 is shown as combined in the same casing with a valve mechanism 11 for manually and automatically controlling the adjustment of the appartus for either empty or load braking. It may be stated that the valve mechanism 11 can, if desired, be separate from the triple valve device. The triple valve device comprises the usual piston 12 contained in piston chamber 13, for operating the main slide valve 14 and the graduating slide valve 15 contained in valve chamber 16. The triple valve shown is of the retarded release type having a yielding resistance device 17 tending to normally maintain the triple valve parts in full release position, as shown in Fig. 1, but this particular form of triple valve need not be used so far as the operation of my invention is concerned.

The valve mechanism 11 preferably comprises a piston 18 contained in piston chamber 19, a slide valve 20 adapted to be operated by said piston and contained in valve chamber 21. One side of the piston 18 is constantly subject to the pressure of a spring 22 and the opposite side is connected by a passage 23 to the triple valve piston chamber 13, so that said opposite side of the piston is subject to the pressure of the brake system, normally from the train pipe, but when the triple valve piston 12 is in emergency position, the port opening of the passage 23 is on the auxiliary reservoir side of the piston 12 and air at auxiliary reservoir pressure is then supplied to the piston 18. This insures maintenance of pressure on said piston when the train pipe pressure is suddenly reduced in an emergency application of the brakes, for reasons to appear hereinafter.

In line with the piston 18 is a port 24 forming communication from the spring chamber side of piston 18 to chamber 25, which is provided with an atmospheric port 26. This port 24 is controlled by a valve 27 carried on a stem 28 and said valve is subject to the pressure of a spring 29 tending to close the valve and thereby communication through the port 24. The stem 28 is connected to a rocker arm 30 pivotally carried on a support 31.

Arranged transversely of the car is a rod 32 having on its adjacent ends hand levers 33 for shifting the rod back and forth between empty and heavy load positions. At an intermediate point the rod 32 is provided with an arm 34 pivotally connected to the rocker arm 30. The rocker arm 30 being slotted for its connection with the arm 34 so as to permit of the necessary rocking movement thereof.

A take-up reservoir 35, as shown in Fig. 4, is connected by pipe 36 to passage 37 leading to the seat of slide valve 20 and the load brake cylinder 7 is connected by a pipe 38 to passage 39 leading to ports 40 and 41 controlled by a valve device 42.

The valve device 42 is subject on one side to the pressure of a spring 43 and is provided with a valve 44 adapted when seated to expose only a restricted area of the valve device 42 to the pressure supplied thereto through a passage 45, leading to the seat of the slide valve 20. When the valve device 42 is seated in its upper position by the spring 43, the load brake cylinder passage 39 is connected through port 41 with the spring side of the valve device 42 and thence to atmospheric port 46.

In operation, with the handle 33 adjusted to the empty position, the valve 27 is seated and spring 22 tends to maintain piston 18 at the position shown in Fig. 1. Air supplied to the train pipe 6 flows through passage 47 of the triple valve device to piston chamber 13 and thence through the usual feed groove 48 around the triple valve piston 12 to valve chamber 16, charging the auxiliary reservoir 1 to the standard pressure carried.

In the normal full release position of the triple valve, as shown in Fig. 1, the usual brake cylinder passage 49 is connected to the exhaust through passage 50, cavity 51 in the main slide valve 14, and exhaust passage 52. Air also flows through passage 23 to valve chamber 21 and thence equalizes, through feed groove 53 around piston 18, into the spring chamber side of the piston, and since the port 24 is closed by valve 27, the opposing fluid pressures on the piston 18 are maintained equal and the spring 22 therefore maintains the piston 18 in the position shown in Fig. 1, in which a cavity 54 in the slide valve 20 connects the take-up reservoir passage 37 with an atmospheric exhaust port 55. Passage 45 leading to the exposed area of valve device 42 is also connected by cavity 54 to the exhaust port 55, so that said exposed area of the valve device is subject to atmospheric pressure and the spring 43 acts to maintain said valve device in its upper seated position in which the load brake cylinder passage 39 is connected through port 41 to the exhaust port 46. It will thus be seen that so long as the valve mechanism 11 is in its empty position, the take-up reservoir remains at atmospheric pressure and the load brake cylinder is open to the exhaust.

As shown in Fig. 2, upon making a gradual reduction in train pipe pressure, the triple valve parts move out to service application position and brake cylinder passage 50 is connected to port 56 in the main slide valve 14, so that fluid is supplied to the first brake cylinder from the auxiliary reservoir in the usual manner.

If it is desired to adjust the apparatus for a loaded car, the handle 33 is shifted to load position and thereby the valve 27 is lifted from its seat and communication is opened from the spring chamber side of piston 18 to the exhaust port 26. The fluid pressure acting on the opposite side of the piston then forces the piston to its outer seat against the resistance of the spring 22, as shown in Fig. 3. In this position, the take-up reservoir passage 37 is connected by cavity 54 with passage 57 leading to the seat of the main slide valve 14, and in release position of the triple valve a through port 58 registers with said passage 57, so that fluid is supplied from the auxiliary reservoir to charge the take-up reservoir to standard pressure. In the load position, the valve 20 also connects a passage 59 opening to brake cylinder passage 49, through a cavity 60, with passage 45, which leads to the normally exposed area of the valve device 42.

With the parts adjusted for load braking, if a gradual reduction in train pipe pressure is made, the triple valve parts are shifted to service application position, as shown in Fig. 3, and in addition to connecting the service port 56 with port 50, the slide valve 14 through cavity 61 connects passage 57 with a passage 62 which opens into passage 59, leading to the first brake cylinder. Fluid thereupon flows from the take-up reservoir 35 through passage 37, cavity 54 in slide valve 20, passage 57, cavity 61, passage 62, and passage 59 to the brake cylinder 2. As these passages are of larger capacity than the service port 56, the take-up reservoir quickly equalizes into the brake cylinder regardless of the degree of reduction in train pipe pressure. After equalization of the take-up reservoir into the brake cylinder 2, air continues to flow from the auxiliary reservoir through the service port 56 until the auxiliary reservoir pressure has reduced to substantially correspond with the reduction in train pipe pressure, then the graduating valve 15 is shifted in the usual manner to close the port 56.

While any desired initial pressure may be obtained in the first brake cylinder, by equalization of the take-up reservoir, according to the size of said reservoir, the reservoir volume is preferably such that the pressures equalize at about 24 pounds.

The spring 43 of valve device 42 is of such resistance that when the brake cylinder pressure which acts on the restricted exposed area thereof reaches or slightly exceeds 24 pounds, the pressure of the spring will be overcome, and the valve 44 being lifted from its seat, the full area of said valve device is exposed to the brake cylinder pressure, and the same is quickly and positively shifted to a seat 63. The port 41 is thereupon cut off from the exhaust port 46 and the port 40 is opened to passage 45, so that fluid from the first brake cylinder can now flow from the passage 45, through port 40 to passage 39 which leads to the load brake cylinder pipe 38.

The fluid supplied to the first brake cylinder 2 serves to take up the slack in the brake rigging and apply the brake shoes to the wheels with a force corresponding to the pressure therein, so that the fluid which now flows into the load brake cylinder 7 only moves the load brake cylinder piston a short distance, the push rod 8 of the load cylinder having previously moved out with the lever 9 without moving the load brake cylinder piston. It should here be stated that the locking device interposed between the load brake cylinder piston and its stem may be of any desired construction, one form being as shown in Figs. 5 and 6, in which the piston or push rod 8 is movable with the brake lever 9 and extends through openings 65 in a casing 66. The casing 66 is secured to a tubular shaft 67 attached to the load brake cylinder piston and contains a pivoted locking pawl 68.

A series of notches 69 is provided on the push rod 8 with which a projection 70 of the pawl 68 is adapted to engage. Secured to opposite sides of the brake cylinder cap 71 are release fingers 72 which are adapted to engage a pivotally mounted yoke 73. The lower portion of the yoke 73 is adapted to engage a projecting portion of the pawl 68 and the parts are so positioned that when the load brake cylinder piston is in release position, the fingers 72 act on the yoke 73 to push the pawl 68 outwardly and thereby lift the projection 70 out of engagement with the notches 69. It will thus be seen that so long as the load brake cylinder piston is in release position, the push rod 8 may move freely back and forth with the brake lever 9, to permit of empty car braking. When the parts are adjusted for load braking, however, the push rod 8 is first pulled out by the action of the brake cylinder 2, and then, air being supplied to the load brake cylinder, the hollow shaft 67 pushes the casing 66 outwardly and permits the yoke 73 to release from the pawl 68, a spring device 74 being adapted to act on the pawl and assist in throwing the projection 70 into engagement with one of the notches 69. It will now be seen that with the load brake cylinder piston locked to the push rod 8, the pressure supplied to the load brake cylinder is transmitted to the brakes to increase the force with which the brakes are applied.

Figure 7:
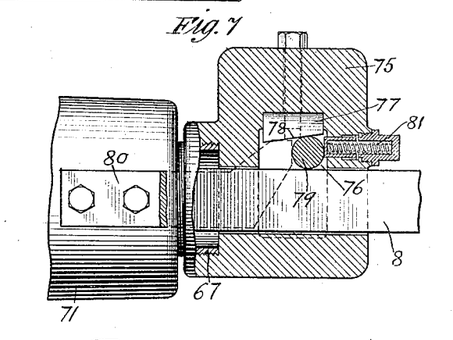
Fig. 7 a sectional detail of another form of clutch mechanism.
Figure 8:
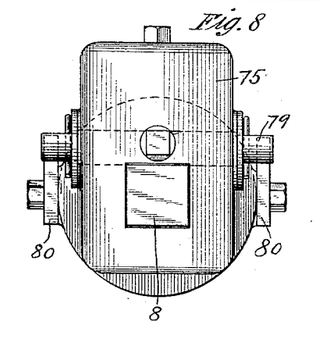
Fig. 8 an end view of said clutch mechanism.
Figure 9:
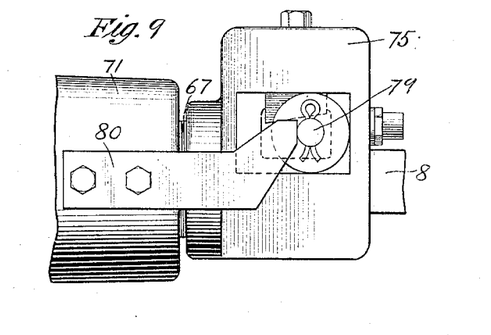
Fig. 9 an elevational view thereof.

Another form of locking device which may be employed is shown in Figs. 7, 8, and 9, in which a casing 75 is secured to the hollow shaft 67 and has a chamber 76 containing a block 77 having an inclined surface 78. A roller 79 is interposed between the surface of the push rod 8 and the incline 78. The ends of the roller 79 project out from the casing 75 and are adapted to engage fingers 80 secured to the brake cylinder cap 71. When the brake cylinder piston is in release position, the fingers 80 engage the roller 79 and push same away from the incline 78, against the resistance of a spring device 81, so that the push rod 8 is free to move to and fro. If the load brake cylinder piston moves out, however, the roller 79 is carried away from the fingers 80 and the spring device 81 forces or wedges the roller between the incline 78 and the surface of the push rod 8, so that the load cylinder piston is locked to the push rod 8 and exerts its force thereon.

The parts are preferably so proportioned that when the load cylinder is opened to the first brake cylinder the equalization of pressures will reduce the pressure from 24 pounds to approximately that standard pressure which would be obtained in the usual brake equipment for the given light reduction in train pipe pressure.

A check valve 82 is interposed in the passage 62 which is adapted to permit flow of air from the take-up reservoir to the brake cylinder but prevents back flow from the brake cylinder to the reservoir. By this means when further reductions in train pipe pressure are made, and the pressure in the two brake cylinders is increased the fluid from the auxiliary reservoir equalizes only into the brake cylinders, and not being required to raise the pressure in the volume of the take-up reservoir, a higher pressure is obtained in the brake cylinders for a given reduction in train pipe pressure.

It will now be seen that with the above described apparatus, the load brake is effective on the first light reduction in train pipe pressure and a powerful load brake is thus obtained with a minimum reservoir volume and a minimum amount of air.

The mechanism for adjusting the apparatus for empty or load braking may be adapted to operate automatically to shift the parts from heavy load position to the empty position in case the pressure in the system falls to a predetermined low degree.

As before described, the fluid pressure on the valve chamber side of piston 18 is supplied from the train pipe through passage 23 and when the parts are set to load position, as shown in Fig. 3, the piston 18 is subject on one side to train pipe pressure and on the opposite side to the pressures of the springs 22 and 29. The resistance of these two springs is adjusted to the point at which it is desired to have the apparatus automatically return to empty position, so that when the train pipe pressure falls to this point, the springs shift the piston 18 back to empty position. In an emergency application, however, while the train pipe pressure may be reduced to a low point, it is not desired that the apparatus shift to empty position, as will be evident, and in order to prevent this, the passage 23 opens into the piston chamber 13 at such a point that when the piston 12 is in emergency position the passage 23 opens to the auxiliary reservoir at the opposite side of the piston and the pressure is thus maintained on the piston 18, so long as the auxiliary reservoir pressure is maintained.

Long experience with the usual standard automatic brake has demonstrated that the best results are obtained when the relative volumes of the auxiliary reservoir and brake cylinder are such that for every reduction of one pound in train pipe pressure, about three and one-quarter pounds pressure, measured in absolute units, will be obtained in the brake cylinder and assuming the maximum standard train pipe pressure as 70 pounds, the final equalization point between the auxiliary reservoir and brake cylinder should be about 50 pounds.

With the load brake construction hereinbefore described it has been found that it requires about 24 pounds pressure in the empty car or first brake cylinder to fully take up the slack in the brake rigging and firmly apply the brake shoes to the wheels, and to obtain this high pressure on the first light reduction in train pipe pressure the so-called take-up reservoir is employed. But when the load cylinder is cut in the equalized pressure in the two brake cylinders is somewhat higher than that which should be obtained according to the above established rule. I have therefore provided means for reducing this pressure to the desired degree, preferably by providing a reduction reservoir normally at atmospheric pressure and adapted to be connected up to the load brake cylinder, so that when the brakes are applied under load, the volume into which the air from the empty or first brake cylinder equalizes consists of the load brake cylinder and the reduction reservoir, said reservoir being of such size that the pressures equalize at the desired degree. It is also found that by reason of the relative volumes of the auxiliary reservoir, the take-up reservoir, and the reduction reservoir being determined by the foregoing considerations, the final resulting equalizing point between the auxiliary reservoir volume and the brake cylinder is somewhat less than the desired 50 pounds. To compensate for this difference, I preferably provide an additional reservoir volume which is adapted to be connected to the auxiliary reservoir in the load position.

An apparatus embodying the above mentioned additional features will now be described.

Figures 10, 11, 12:
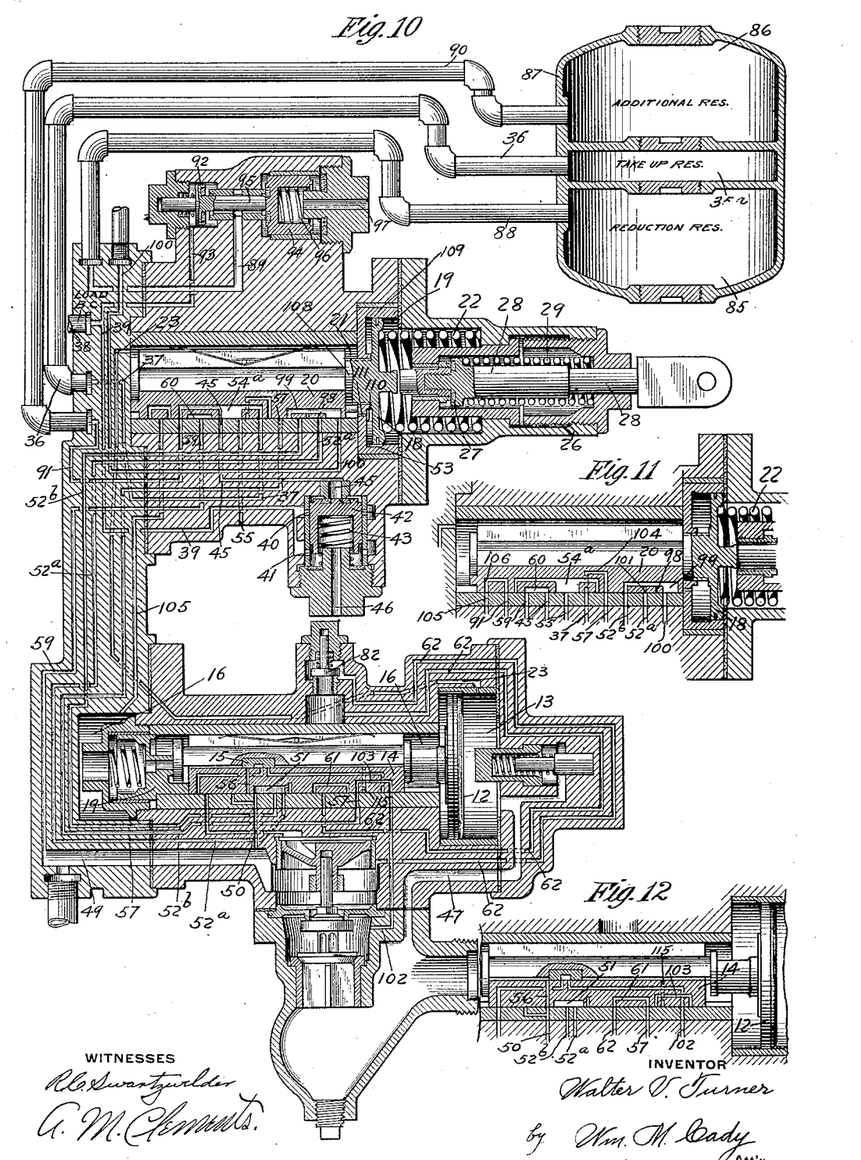
Fig. 10 a sectional view of a load brake apparatus embodying additional features of my invention.
Fig. 11 a detail sectional view of the change-over portion thereof adjusted to load position.
Fig. 12 a similar view of the triple valve portion of said load brake apparatus in service application position.

As shown in Figs. 10 to 12 of the drawings, the apparatus is for the most part the same as that hereinbefore described and like reference numerals designate such like parts. In addition, a reduction reservoir 85 and a supplemental reservoir 86 are provided and with the take-up reservoir 35ª may conveniently be incorporated in a single casing 87, as shown. The reduction reservoir 85 is connected by a pipe 88 to a passage 89 and the supplemental reservoir 86 is connected by a pipe 90 to a passage 91 leading to the seat of slide valve 20. A valve 92 controls communication from passage 89 to a passage 93 leading to the load brake cylinder pipe 38 and a double seated valve piston 94 is adapted to operate said valve, by contact with valve stem 95.

The double seated piston 94 is normally seated in one position by a spring 96 and in this position holds the valve 92 off its seat, establishing communication from the reduction reservoir 85 to the load brake cylinder. The spring side of the piston 94 is open to the atmosphere through a port 97 and when the piston is on its inner seat a restricted area thereof is exposed to the pressure in the reduction reservoir 85 and the load brake cylinder.

When the apparatus is adjusted to the empty position, as shown in Fig. 10, the brakes are applied and released in the usual manner except that in release position, air is released from the empty car brake cylinder through port 50, cavity 51 and passage 52ª which leads to the seat of the slide valve 20 and thence through a restricted port 98 to cavity 99 which communicates in empty load position with exhaust passage 100.

If the device is adjusted to load position, the valve 20 assumes the position shown in Fig. 11, in which an additional exhaust passage 52ᵇ opening into the exhaust cavity 51 of the triple valve is connected to cavity 99 and exhaust passage 52ª is connected to said cavity through a port 101 which is of greater capacity than the port 98. This permits of a greater rate of exhaust in load position to correspond with the increased brake cylinder volume to be released.

The take-up reservoir is charged in this position through a passage 102 leading from the check valve chamber of the triple valve, cavity 103 in slide valve 14, passage 57, cavity 104 in slide valve 20, passage 37, and pipe 36. The additional reservoir 86 is charged through passage 105, leading from valve chamber 16 and the auxiliary reservoir, cavity 106 in slide valve 20, passage 91, and pipe 90, as shown in Fig. 11.

If the train pipe pressure is reduced to effect a service application of the brakes, the triple valve moves over to service position, as shown in Fig. 12, and connects the service port 56 with port 50 to supply air from the auxiliary reservoir to the brake cylinder passage 49. The slide valve 14 also connects passage 62 with passage 57 through cavity 61, so that communication is open from the take-up reservoir to the empty car brake cylinder through pipe 36, passage 37, cavity 104, passage 57, cavity 61, passage 62, and past check valve 82 to brake cylinder passage 49. The empty car brake cylinder is thus supplied with fluid from the take-up reservoir and auxiliary reservoir, applying the brakes. The brake cylinder pressure in the empty car brake cylinder acts on the exposed area of valve piston 42 through passage 59, cavity 60, and passage 45, and when the pressure equals or slightly exceeds the resistance of spring 43, preferably about 24 pounds, said valve piston is shifted and the load brake cylinder is connected to the empty car brake cylinder through port 40 and passage 39. As before described, the valve 92 is normally open, so that the fluid supplied to the load brake cylinder equalizes through passages 93 and 89 into the reduction reservoir 85. When the pressure in the load brake cylinder has reached a predetermined degree, preferably about 10 pounds, the valve piston 94 is shifted to its outer seat, permitting the valve 92 to seat and cut off communication between the load brake cylinder and the reduction reservoir 85.

By properly proportioning the reduction reservoir 85, it will be evident that any desired initial equalizing pressure in the brake cylinders may be obtained, so that the brake cylinder pressure when the load brake cylinder is first cut in may be made to correspond with the desired pressure for a given reduction in train pipe pressure.

The volume of the additional reservoir 86 being connected to the auxiliary reservoir in load position, the auxiliary reservoir volume is thereby increased so as to give the desired ultimate equalization point between the auxiliary reservoir and the brake cylinders.

As the reduction reservoir 85 is cut off when the pressure in the brake cylinder becomes 10 pounds, further increases in brake cylinder pressure may be made without equalizing into said reservoir, so that a minimum amount of air is required to secure the desired ultimate degree of equalization.

The piston 18 may have its stem 108 arranged in a guide bearing of the bushing 109, and in empty position, the piston 18 is adapted to seat on the bushing. Communication is established between the valve chamber 21 and the space 110 through a restricted port 111, of less capacity than the feed groove 53, so that if the stem 28 should be shifted to load position before the brake system is charged up, the piston 18 will not be shifted to load position until the pressure has built up to a certain desired point on the area of piston stem 108, which is constantly exposed to the pressure in valve chamber 21, because the flow of air through the restricted port 111 will not cause any substantial increase in pressure in chamber 110 on the left of piston 18 as air can flow out of chamber 110 through the groove 53 at a greater rate than it can be supplied through the port 111. This also prevents accidental movement of the parts for the reason that the pressure in chamber 110 cannot be made to exceed the pressure on the opposite or spring chamber side of the piston.

A through port 115 may be provided in the slide valve 14 which is adapted, in the retarded release position, to register with passage 57 leading to the take-up reservoir 35ª. This insures charging of the take-up reservoir with the auxiliary reservoir in this position instead of full release position and as the take-up reservoir is cut off from the auxiliary reservoir in full release position the possibility is prevented where the pressure in the take-up reservoir is less than the pressure in the auxiliary reservoir, of causing the triple valve piston to be returned from full release position to the retarded release position by the venting of air from the auxiliary reservoir to the take-up reservoir.

It will now be evident that I have provided an empty and load brake apparatus in which very little more than the usual auxiliary reservoir capacity is employed and in which the apparatus consists of but a few more parts than is ordinarily required for a standard car brake equipment.

With this apparatus, the load brake is effective on the first light application of the brakes and the brake cylinder pressures obtained throughout the range of reductions in train pipe pressure are in accordance with the rule as to the ratio between the train pipe reduction and brake cylinder pressure. Also the full standard degree of equalization is retained and further, all of the above results are secured with a volume of air scarcely greater than that of the usual auxiliary reservoir volume. As the load brake cylinder piston only moves out a very short distance and thus only requires a small volume of air, the size of the load brake cylinder may be varied to correspond with different capacity cars without changing the brake cylinder pressures obtained to any substantial degree. This fact enables the employment of the same apparatus on all cars by merely changing the size of load brake cylinder to correspond with the capacity of car on which it is applied.

Having now described my invention, what I claim as new and desire to secure by Letters Patent, is:—

1. In a load brake apparatus, the combination with a train pipe, triple valve, brake cylinder, and auxiliary reservoir, of a second brake cylinder, an additional source of fluid pressure adapted to equalize into the first brake cylinder upon a reduction in train pipe pressure, and means operating at a predetermined degree of pressure in the first brake cylinder for supplying fluid to the second brake cylinder.

2. In a load brake apparatus, the combination with a train pipe, triple valve, brake cylinder, and auxiliary reservoir, of an additional source of fluid pressure adapted to equalize into the brake cylinder in making a service application of the brakes, a second brake cylinder, and means for connecting the second brake cylinder to the first brake cylinder at a predetermined degree of pressure in the first brake cylinder.

3. In a load brake apparatus, the combination with a train pipe, triple valve, brake cylinder, and auxiliary reservoir, of a device for adjusting the apparatus for empty or for load braking, a reservoir containing fluid under pressure and adapted in load position to equalize into the brake cylinder in making a service application of the brakes, a second brake cylinder, means for opening communication from the first brake cylinder to the second brake cylinder at a predetermined degree of pressure in the first brake cylinder, and means for connecting up the second brake cylinder to exert power to apply the brakes with increased force upon supplying fluid under pressure to said second brake cylinder.

4. In a load brake apparatus, the combination with a train pipe, triple valve, brake cylinder, and auxiliary reservoir, of a reservoir containing fluid under pressure adapted to equalize into said brake cylinder upon the first movement of the triple valve to effect an application of the brakes, while fluid is supplied from the auxiliary reservoir to the brake cylinder in the usual manner.

5. In a load brake apparatus, the combination with a train pipe, triple valve, brake cylinder, and auxiliary reservoir, of a reservoir containing fluid under pressure adapted to equalize into said brake cylinder upon the first movement of the triple valve to effect an application of the brakes, while fluid is supplied from the auxiliary reservoir to the brake cylinder in the usual manner, a second brake cylinder, and means for opening communication from the first brake cylinder to the second brake cylinder at a predetermined degree of pressure in the first brake cylinder.

6. In a load brake apparatus, the combination with a train pipe, triple valve, brake cylinder, and auxiliary reservoir, of a reservoir containing fluid under pressure adapted to equalize into said brake cylinder upon the first movement of the triple valve to effect an application of the brakes, while fluid is supplied from the auxiliary reservoir to the brake cylinder in the usual manner, a second brake cylinder, means for opening communication from the first brake cylinder to the second brake cylinder at a predetermined degree of pressure in the first brake cylinder, and a clutch device for connecting the second brake cylinder to exert power to apply the brakes with increased force upon admission of fluid to said second brake cylinder.

7. In a load brake apparatus, the combination with a train pipe, triple valve, brake cylinder, and auxiliary reservoir, of a device for adjusting the apparatus for empty or for load braking, a reservoir adapted to be charged with fluid under pressure and to be connected in load position with the brake cylinder in making a service application of the brakes, a second brake cylinder, a valve piston subject to the opposing pressures of the first brake cylinder and a spring and adapted at a predetermined pressure in the first brake cylinder to open communication from the first brake cylinder to the second brake cylinder, and a clutch mechanism for operatively connecting the piston of the second brake cylinder to exert pressure to apply the brakes with increased power upon the admission of fluid to said second brake cylinder.

8. In a load brake apparatus, the combination with a train pipe, triple valve, brake cylinder, and auxiliary reservoir, of an additional source of fluid pressure adapted to equalize into the brake cylinder in making a service application of the brakes, a check valve for preventing flow of air from the brake cylinder to the additional source of pressure, a second brake cylinder, and means for supplying fluid to the second brake cylinder at a predetermined degree of pressure in the first brake cylinder.

9. In a load brake apparatus, the combination with a train pipe, triple valve, brake cylinder, and auxiliary reservoir, of an additional source of fluid pressure adapted to supply air to the brake cylinder in making an application of the brakes, a second brake cylinder, means for opening communication from the first to the second brake cylinder at a predetermined degree of pressure in the first brake cylinder, and a reduction reservoir adapted to be connected to said second brake cylinder.

10. In a load brake apparatus, the combination with a train pipe, triple valve, brake cylinder, and auxiliary reservoir, of a device for adjusting the apparatus for empty or load braking, a reservoir charged with fluid under pressure and adapted in load position to supply air to the brake cylinder in making an application of the brakes, a second brake cylinder, means for opening communication from the first to the second brake cylinder at a predetermined degree of pressure in the first brake cylinder, and a reduction reservoir, normally at atmospheric pressure, and adapted in load position to communicate with the second brake cylinder.

11. In a load brake apparatus, the combination with a train pipe, triple valve, brake cylinder, and auxiliary reservoir, of an additional source of fluid pressure adapted to supply air to the brake cylinder in making an application of the brakes, a second brake cylinder, means for opening communication from the first to the second brake cylinder at a predetermined degree of pressure in the first brake cylinder, a reduction reservoir adapted to be connected with said second brake cylinder, and a valve device operating at a predetermined degree of pressure in the second brake cylinder for cutting off communication between said brake cylinder and the reservoir.

12. In a load brake apparatus, the combination with a train pipe, brake cylinder, and auxiliary reservoir, of a reservoir adapted to be charged with fluid under pressure, a device for adjusting the apparatus for empty or load braking, a triple valve having ports adapted in service application position to connect said reservoir with the brake cylinder, and also ports for connecting the auxiliary reservoir with said brake cylinder a second brake cylinder, and means operating at a predetermined degree of pressure in the first brake cylinder for opening communication from the first to the second brake cylinder.

13. In a load brake apparatus, the combination with a train pipe, triple valve, brake cylinder, and auxiliary reservoir, of a second brake cylinder, a take-up reservoir adapted to be charged with fluid under pressure, means for connecting said reservoir to the first brake cylinder in load position upon a service application of the brakes, and means operating at a predetermined pressure in the first brake cylinder for opening communication from the first to the second brake cylinder and means for preventing back flow of air from the second brake cylinder to the take-up reservoir.

14. In a load brake apparatus, the combination with a train pipe, triple valve, brake cylinder, and auxiliary reservoir of a second brake cylinder, means for cutting said second brake cylinder into action with the first brake cylinder, in load position, and a reduction reservoir normally at atmospheric pressure and adapted in load position to be connected to the second brake cylinder.

15. In a load brake apparatus, the combination with a train pipe, triple valve, brake cylinder, and auxiliary reservoir, of a second brake cylinder, means for cutting said second brake cylinder into action with the first brake cylinder, in load position, a reduction reservoir normally at atmospheric pressure and adapted in load position to be connected to the second brake cylinder, and means for closing communication from the second brake cylinder to the reduction reservoir at a predetermined pressure in the second brake cylinder.

16. In a load brake apparatus, the combination with a train pipe, triple valve, brake cylinder, and auxiliary reservoir, of a second brake cylinder, a take-up reservoir adapted to be charged with fluid under pressure, and adapted in load position to be connected to the first brake cylinder upon making a service application of the brakes, a reduction reservoir normally at atmospheric pressure and adapted to be connected to the second brake cylinder in load position, and means for opening communication from the first to the second brake cylinder at a predetermined pressure in the first brake cylinder.

17. In a load brake apparatus, the combination with a train pipe, triple valve, brake cylinder, and auxiliary reservoir, of a second brake cylinder, a take-up reservoir adapted in load position to be charged with fluid under pressure and to be connected with the first brake cylinder upon making a service application of the brakes, means for opening communication from the first brake cylinder to the second at a predetermined pressure in the first brake cylinder, a reduction reservoir normally at atmospheric pressure and adapted to be connected to the second brake cylinder in load position, and an additional reservoir adapted in load position to be charged with fluid under pressure and to be connected to the auxiliary reservoir.

18. In a load brake apparatus, the combination with a train pipe, triple valve, brake cylinder, and auxiliary reservoir, of a second brake cylinder, a take-up reservoir adapted in load position to be charged with fluid under pressure and to be connected with the first brake cylinder upon making a service application of the brakes, means for opening communication from the first brake cylinder to the second at a predetermined pressure in the first brake cylinder, a clutch mechanism for connecting the second brake cylinder piston to the brake rigging upon the application of fluid under pressure to the second brake cylinder, a reduction reservoir normally at atmospheric pressure and connected in load position to the second brake cylinder, and an additional reservoir adapted to be charged with fluid under pressure and to be connected with the auxiliary reservoir in load position.

19. The combination with two brake cylinders, and pistons therefor, one of which is operatively connected to the brake rigging, of a clutch device for operatively connecting the other brake cylinder piston with the brake rigging, comprising a member connected to the brake rigging, a pawl movable with the brake cylinder piston and adapted to engage notches in said member, a release device adapted to engage the pawl for throwing the same out of engagement with the notches, and a stop device adapted upon movement of the brake cylinder piston to release position to operate said release device.

20. The combination with two brake cylinders, and pistons therefor, one of which is operatively connected to the brake rigging of a clutch device for operatively connecting the other brake cylinder piston with the brake rigging, comprising a member connected to the brake rigging, a pawl movable with the brake cylinder piston and adapted to engage notches in said member, a release device adapted to engage the pawl for throwing the same out of engagement with the notches, a stop device adapted to operate said release device upon movement of the brake cylinder piston to release position, and a spring tending to move the pawl to engage in the notches.

21. In a load brake apparatus, the combination with a train pipe, triple valve, brake cylinder, and auxiliary reservoir, of a second brake cylinder, an additional source of fluid pressure adapted to equalize into the first brake cylinder in service application position of the triple valve and means operating at a predetermined degree of pressure in the first brake cylinder for opening communication to permit flow of air from the auxiliary reservoir to the second brake cylinder.

22. In a load brake apparatus, the combination with a train pipe, brake cylinder, and auxiliary reservoir, of a triple valve device comprising a piston, a main valve and auxiliary valve operated thereby for controlling communication from the auxiliary reservoir to the brake cylinder in service application position, an additional source of fluid pressure adapted to be connected to the brake cylinder through the main valve in service application position, and a second brake cylinder adapted to be connected to the first upon a predetermined increase in pressure in the first brake cylinder.

In testimony whereof I hereunto set my hand.

WALTER V. TURNER.

Witnesses:
A. M. CLEMENTS,
S. W. KEEFER.

Copies of this patent may be obtained for five cents each, by addressing the "Commissioner of Patents, Washington, D. C."